INVENTOR.
ROGER C. BRENDEMUEHL,
BY
Wolfe, Hubbard, Leydig, Voit & Osann
ATTORNEYS.

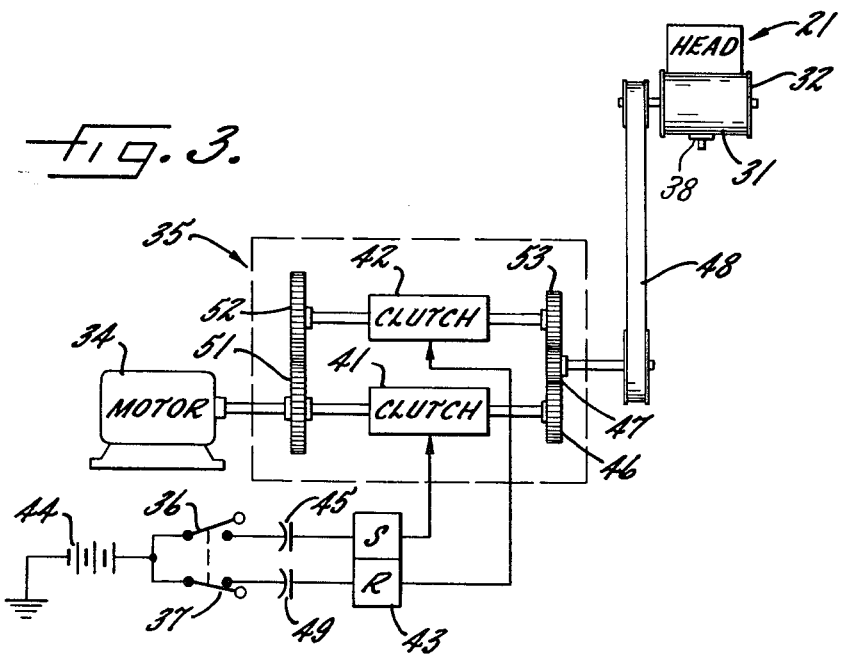
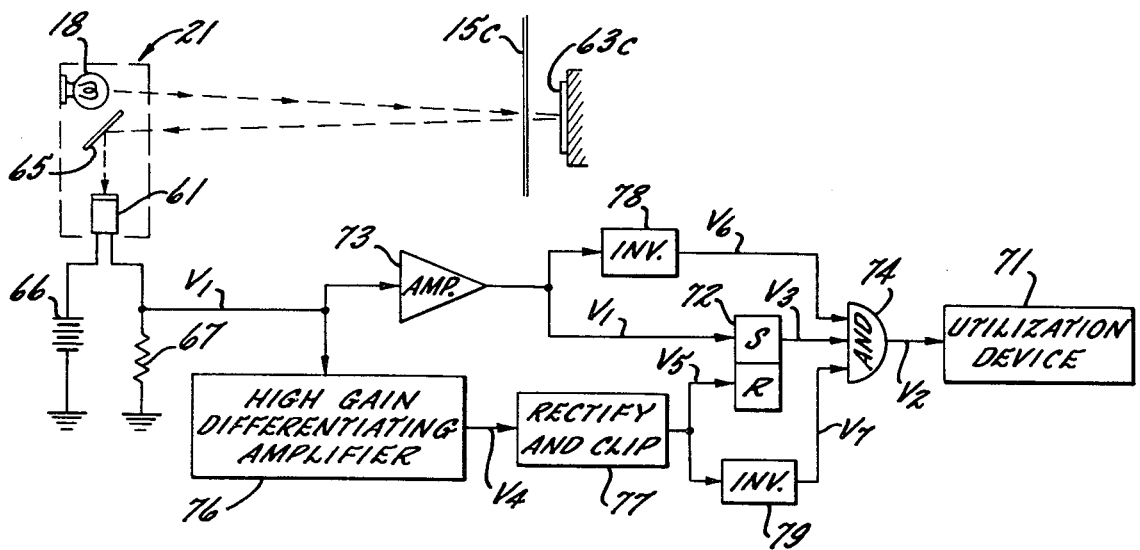

United States Patent Office 3,676,009
Patented July 11, 1972

3,676,009
PHOTOELECTRIC DISCONTINUITY AND THE LIKE DETECTOR FOR MULTIELEMENT ARRAYS
Roger C. Brendemuehl, Beloit, Wis., assignor to Warner Electric Brake & Clutch Company, South Beloit, Ill.
Filed Dec. 22, 1970, Ser. No. 100,708
Int. Cl. G01n 21/18
U.S. Cl. 356—199    23 Claims

ABSTRACT OF THE DISCLOSURE

A radiant energy scanner, specifically a photoelectric scanner, for inspecting multielement arrays to detect missing or broken element conditions comprises a radiant energy transmit-receive head spaced from one side of the array and first and second sets of surfaces with different degrees of reflectance spaced from the opposite side of the array. The head is reciprocated to sweep a radiant energy, i.e., light beam, across the elements, and the first and second sets of surfaces are positioned relative to the elements so that the beam is transmitted and received at any given instant along substantially the same optical axis. Further, the first set of surfaces have a relatively high reflectance and align with element inspection areas to complete a first set of alternate beam transmission paths which have a relatively low attenuation level that is momentarily increased to a slightly higher level each time the beam traverses an element. The second set of surfaces have a relatively low reflectance and align with the spaces adjacent the inspection areas to complete a second set of alternate beam transmission paths which have a relatively high attenuation level. A logic circuit is included to provide an output indication of a missing element condition when the intensity of the received beam changes in immediately successive steps from a relatively low level, to a relatively high level, and back to the relatively low level, without an intervening change to an intermediate level.

BACKGROUND OF THE INVENTION

This invention relates to discontinuity or missing element detectors for multielement arrays, and more particularly to scanning-type inspection apparatus for detecting the absence of or any break in any one of an array of spaced apart elements.

There are numerous and various manufacturing processes, for example, in the textile manufacturing and the twisted wire or filament manufacturing arts to name just a few, which involve multielement arrays from which one or more elements may be missing at any given time due to an exhausted supply, a break in an element, a mechanical failure of the manufacturing equipment, or the like. When a missing element condition occurs, it is generally important that appropriate action be taken to either shut down the manufacturing process or restore the missing element, and usually it is desirable that such action be taken without much delay. Otherwise there will at least be a marked reduction in the quality of the product manufactured from the imperfect array and possibly a total loss of the materials and time consumed while the element is missing. Frequently, however, it is virtually impossible to obtain timely detection of a missing element condition by relying on whatever visual inspection an operator may be able to make of the array, especially when a large number of elements are involved or other tasks require the operator's attention. Accordingly, some form of detection or inspection apparatus is usually used if there is to be reliable and timely detection of such a condition.

The various types of inspection apparatuses that have been available heretofore for detecting missing element conditions in multielement arrays have not been totally satisfactory. For instance, many times the inspection apparatus is found to be bulky and unwieldly, with the result that it cannot be readily adapted to the particular manufacturing equipment or process with which it is to be used. Also, on occasion, the inspection apparatus actually interferes with or imposes limitations on the manufacturing process and, therefore, causes a loss of efficiency. Further, some types of inspection apparatus impose a mechanical load on the element being inspected and, consequently, are at best of questionable value for use with arrays of frangible elements, such as fine threads or wires. Moreover, some forms of inspection apparatus are color sensitive to the extent that they must be readjusted to accommodate changes in the color of the elements under inspection.

SUMMARY OF THE INVENTION

In view of the foregoing, a general object of the present invention is to provide new and improved inspection apparatus for monitoring multielement arrays for missing element conditions, without either disturbing any manufacturing process in which the elements may be involved or imposing any mechanical load on the elements. A more specific related object is to provide inspection apparatus of the foregoing type which does not require physical contact with the elements. A detailed related object is to provide inspection apparatus which may be used to detect missing element conditions in arrays of frangible elements without increasing the risk of any of the elements breaking, even if there is relative motion between the array and the inspection apparatus.

Another object of this invention is to provide relatively simple and economical, but highly reliable, scanning-type inspection apparatus employing a radiant energy beam for detecting the absence of any one of an array of spaced apart elements. A more specific related object is to provide inspection apparatus of the foregoing type wherein radiant energy reflection techniques are employed so that the same scanning equipment can be used for sweeping the radiant energy beam across the elements and for synchronously positioning a beam receiver. More particularly, it is an object of this invention to provide photoelectric scanning-type inspection apparatus for monitoring multielement arrays for missing element conditions.

A further object of the present invention is to provide inspection apparatus of the foregoing type which is suitable for use with a wide variety of different manufacturing processes and which can be readily adapted to different types of manufacturing equipment. A related object is to provide inspection apparatus of the foregoing type which can tolerate, without readjustment, wide ranges of changes in the color and texture of the elements of the array under inspection.

BRIEF DESCRIPTION OF THE DRAWINGS

Other objects and advantages of the present invention will become apparent from the following detailed description, taken in conjunction with the attached drawings, in which:

FIG. 3 is a simplified diagram of an exemplary drive mechanism for imparting a scanning motion to the transmit-receive head of the inspection apparatus;

FIG. 4 is a block diagram of a logic circuit which is suitable for use in the inspection apparatus to signal the absence of or a discontinuity in any one of the elements under inspection.

DETAILED DESCRIPTION OF THE ILLUSTRATED EMBODIMENT

While the invention will be described hereinafter in connection with a single illustrated embodiment, it is to be understood that the intent is not to limit it to that embodiment. To the contrary, the intent is to cover all alternatives, modifications and equivalents falling within the spirit and scope of the invention as defined by the appended claims.

Figure 1:
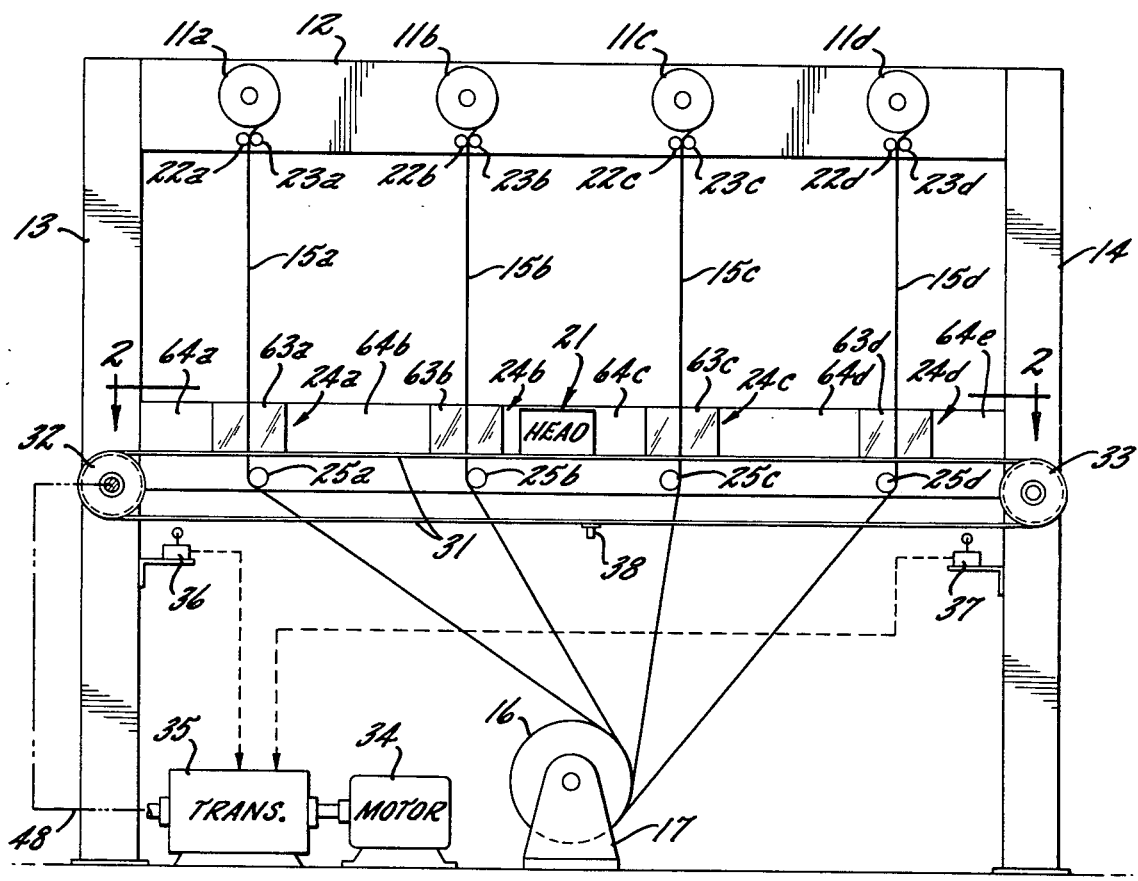
FIG. 1 is a simplified elevational view of a multiple spindle winding machine having inspection apparatus constructed in accordance with the principles of the present invention installed thereon.
Figure 2:
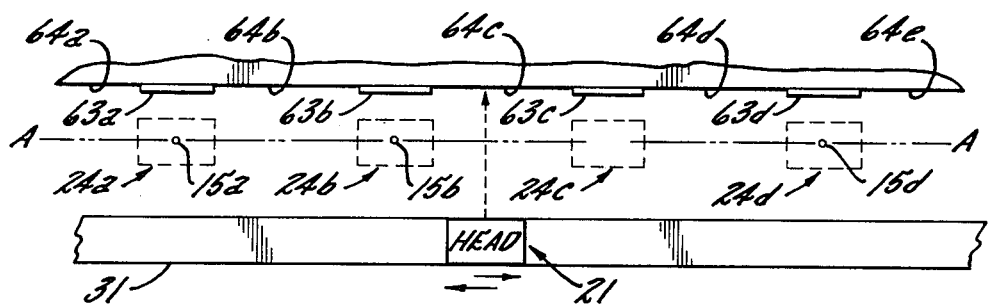
FIG. 2 is a fragmentary cross section taken along the line 2—2 in FIG. 1 to further illustrate the inspection apparatus.

Turning now to the drawings, and particularly to FIGS. 1 and 2, the inspection apparatus of the present invention is shown for illustrative purposes as being installed on a multiple spindle winding machine. This illustrative environment for the inspection apparatus is not intended and should not be understood as indicating anything more thna one of the many types of equipment with which the inspection aparatus may be used to substantial advantage. Indeed, the details of the winding machine are for the most part only incidental and not necessary to a full understanding of the present invention. Accordingly, the winding machine is shown in a highly simplified and rudimentary form.

With that in mind, it will be seen that the illustrated winding machine comprises a plurality of horizontally spaced feed rolls $11a-11d$ which are journalled on a frame cross member 12 which, in turn, is appropriately supported by vertical columns, such as the ones indicated at 13 and 14. Elongated elements $15a-15d$, such as threads, yarns, ropes, cables, wires or strips, are fed in an array from the feed rolls $11a-11d$ to a takeup roll 16. Suitably, the takeup roll 16 is journalled on a bracket 17 and driven by a motor (not shown) to maintain substantially constant tension on each of the elements $15a-15d$.

In accordance with the present invention, for detecting the absence of any of the elements $15a-15d$ of the array without making physical contact with them, the inspection apparatus includes a source 18 for supplying a beam of radiant energy and means for sweeping the beam across the array (i.e., across the elements $15a-15d$ and the spaces adjacent them). The radiant energy is selected to be of a type to which the elements $15a-15d$ are reactive, such that they possess distinctive attenuation properties for the beam. The beam is, in turn, sufficiently collimated, either as supplied by the source 18 or by virtue of additional collimating equipment (not shown), that it is carried by successive transmission paths as it sweeps across the array and has its intensity characteristically modulated or changed as it traverses each of the elements $15a-15d$. Further, provision is made for signaling the sweep of the beam from one element position of the array to the next. Thus, whenever the beam sweeps across an element position without having its intensity momentarily changed or modulated, there is a reliable and detectable indication that an element is missing from the array and appropriate corrective action can be promptly initiated.

In the illustrated embodiment, the sweep of the beam from position to position within the arroy is signaled on a real time basis. That is, the elements $15a-15d$ are spaced apart during the inspection process and provision is made to further modulate the beam intensity as it sweeps the spaces adjacent the elements $15a-15d$, such that the further modulation indicates that the beam is sweeping from one element position to the next. However, it is to be understood that the same signaling function can be accomplished on a time domain basis without departing from the broader aspects of this invention, such as by electrically or mechanically synchronizing a pulse generator with the sweep of the radiant energy beam to supply a marker pulse as the beam sweeps from position to position. Time domain signaling has the advantage of permitting the use of the instant invention when the elements are too closely spaced for reliable signalling on a real time basis, but it is otherwise not as desirable as real time signaling since it increases the complexity of the inspection apparatus. Further, when time domain signaling is employed, there is the possibility that the synchronism between the signaling equipment and the beam sweep will be lost and, therefore, an increased risk of malfunction of the inspection apparatus.

As shown in FIGS. 1–4 a scanning motion may be employed to sweep the beam across the array. To that end, the source 18 is housed in a head 21 which, in turn, is guided for movement along a predetermined path remote from the elements $15a-15d$. Preferably, the path for movement of the head 21 generally conforms to the geometry defined by a cross section taken through the elements $15a-15d$ at the positions in which they are to be inspected. Under those conditions, the beam length and, therefore, its intensity and degree of collimation remain substantially constant as the head 21 is moved. For example, in the simplified winding machine shown in FIG. 1, the elements $15a-15d$ are guided from the feed rolls $11a-11d$ by respective sets of guide rollers $22a$, $23a-22a$, $23d$. Thus, the elements $15-15d$ are spaced apart in a generally planar array as they are moved lengthwise relative to the inspection apparatus through respective element positions or inspection areas $24a-24d$. Once past the inspection areas, the elements $15a-15d$ are guided by respective turning bars $25a-25d$ toward the take-up roll 16. As can best be seen in FIG. 2, in a cross section taken through the inspection areas $24a-24d$, the elements $15a-15d$ define a line A—A which cuts across the array. Thus, it will be understood that for inspection of a planar array of elements the head 21 is preferably mounted for movement across the array along a line that is spaced from but generally parallel to the plane of the array.

Since, as previously mentioned, the beam must be sufficiently collimated to ensure that its intensity is modulated as it traverses the elements $15a-15d$, the permissible spacing between the head 21 and the plane of the array depends primarily on the degree of collimation of the beam as supplied by the source 18, either with or without the benefit of additional beam collimating equipment, together with the dimensions of the elements $15a-15d$ along the line of travel of the beam across them, i.e., the width of the elements $15a-15d$ as here shown. In the illustrated embodiment, wherein the source 18 is a conventional lamp and the collimation of the light beam is increased by additional collimating equipment such as lenses, a suitable spacing between the head 21 and the plane of the array for the inspection of threads or wires is on the order of up to about six or eight inches, depending on the particular diameter of the threads or wires.

In general, frequent and repeated inspection of the elements $15a-15d$ is desirable, so that there is no undue delay in detecting the absence of any of them. This is particularly so when the elements $15a-15d$ are thin threads or wires that are easily broken. Accordingly, for repeated inspection of the planar array of elements $15a-15d$, a drive mechanism is provided to reciprocate the head 21 back and forth across the array.

The specific drive mechanism used is unimportant insofar as the instant invention is concerned. However, in the interest of completeness, an exemplary drive mechanism has been shown as including an endless belt 31 which is trained around a pair of rollers 32 and 33 which, in turn, are respectively journalled on the columns 13 and 14. The head 21 is carried on the upper reach of the belt 31, and the source 18 is positioned within the head 21 at the level of the inspection areas $24a-24d$ to transmit the radiant energy beam along a line substantially normal to the plane of the elements $15a-15d$.

The drive mechanism is powered by a motor 34 which is coupled to the roller 32 through a transmission 35. The transmission 35 reverses the direction of travel of the head 21 under the control of a pair of limit switches 36 and 37 which are biased open, such as by springs or the like (not shown). More particularly, as shown in FIG. 1, the limit switches 36 and 37 are respectively mounted on the columns 13 and 14 in position to be tripped or momentarily closed as the head 21 reaches respective ones of the opposite ends of the element array by a finger 38. The finger 38 is carried on the lower reach of the belt 31 and, therefore, moves counterdirectionally of the head 21. As shown in FIG. 3, the illustrated transmission 35 includes a pair of clutches 41 and 42 which are selectively energized by a flip-flop circuit 43, which, in turn, is respectively set and reset as the limit switches 36 and 37 are tripped. In the exemplary transmission, the flip-flop circuit 43 is assumed to respond to the positive going transitions of its input signals. Thus, when the head 21 reaches the right-hand end of the element array, the limit switch 36 is tripped to connect the positive terminal of a battery 44 to a capacitor 45 which, therefore, supplies a positive going pulse to set the flip-flop circuit 43. When the flip-flop circuit 43 is set, it supplies an energizing signal to engage the clutch 41 such that the power for the drive mechanism is supplied from the motor 34, through the clutch 41, a drive gear 46, an output gear 47, and a belt and pulley arrangement 48 to drive the head 21 towards the opposite or left-hand end of the array. On the other hand, when the head 21 reaches the left-hand end of the array, the limit switch 37 is tripped to connect the positive terminal of the battery 44 to a capacitor 49. Hence, a positive going pulse is supplied to reset the flip-flop circuit 43. As a result, the clutch 41 is disengaged and the clutch 42 is engaged, so that the power for the drive mechanism is then supplied from the motor 34, through a pair of meshed gears 51 and 52, the clutch 42, a drive gear 53, the output gear 47, and the belt and pulley arrangement 48 to drive the head 21 back toward the right-hand end of the array. As will be seen, the above sequence repeats itself so long as power is supplied by the motor 35. Consequently, the head 21 is cyclically reciprocated back and forth across the array.

For carrying out the present invention with real time signaling of the sweep of the beam from one element position or inspection area to the next, provision is made within the inspection apparatus to set one characteristic attenuation level for the transmission paths by which the beam is carried as it traverses the inspection areas 24a–24d and another characteristic attenuation level for the transmission paths by which the beam is carried as it traverses the spaces adjacent the inspection areas 24a–24d. Thus, the transmission paths including the inspection areas 24a–24d define a first set of alternate paths having a first attenuation level, whereas the transmission paths including the spaces adjacent the inspection areas 24a–24d define a second set of alternate paths having a second attenuation level. Furthermore, a relatively narrow segment or portion of each of the first set of transmission paths is positioned to align with and include a respective one of the elements 15a–15d such that the attenuation level of that segment is modified or changed to a third level when an element is present. Accordingly, it will be understood that as the beam sweeps across the inspection areas 24a–24d and the adjacent spaces its intensity is modulated by virtue of the different attenuation levels of the successive paths by which it is carried in a manner indicating whether or not any of the elements 15a–15d is absent. For example, consider a situation, such as shown in FIG. 2, in which the beam sweeps across the inspection area 24c and its adjacent spaces and the element 15c has broken or for some other reason is missing. Under those circumstances the beam intensity will change in immediately successive steps from a first level to a second level and back to the first level, without an intervening change to a third level. If, on the other hand, the element 15c is present, there will be an intervening change in the beam intensity to the third level due to the modifying effect of the element 15c on the attenuation level for the aligned portion of the inspection area 24c.

To accommodate the particular logic circuitry discussed hereinafter, the attenuation levels for the first and second sets of alternate beam transmission paths are selected so that the beam sees an intermediate attenuation level as it traverses the elements 15a–15d. Under those conditions, the attenuation levels for the first and second sets of transmission paths are preferably selected to afford a substantial range of intermediate levels so that wide ranges of changes in the color and texture of the elements 15a–15d can be tolerated without readjustment of the inspection apparatus.

In keeping wtih certain of the more detailed features of the present invention, the attenuation levels for the aforementioned first and second sets of alternate beam transmission paths are established by the reflectance characteristics of respective sets of alternate surfaces 63a–63d and 64a–64e. To that end, the surfaces 63a–63d and 64a–64e are mounted on a cross member 62 behind the element array, i.e., at the side thereof opposite the source 18. The surfaces 63a–63d are positioned in alignment with the inspection areas 24a–24d, whereas the surfaces 64a–64e are positioned in alignment with the spaces between or adjacent the inspection areas. Moreover, to simplify the beam receiver, the surfaces 63a–63d and 64a–64e are positioned to reflect the beam transmitted by the source 18 back toward the head 21. For example, as here shown, wherein the head 21 is reciprocated along a substantially linear path, the surfaces 63a–63d and 64a–64e are maintained in a plane that is substantially parallel to the path of the head 21. Thus, only a single beam receiver 61 is required and, even more importantly, it can be included within the head 21 for positioning by the same scanning equipment as is used to sweep the beam across the array. Accordingly, there is substantially failsafe synchronism between the positioning of the beam receiver 61 and the sweep of the beam across the array.

In the illustrated embodiment the radiant energy beam is a light beam, and the beam receiver 61 is therefore a photoelectric element upon which the reflected light is focused, such as by a mirror 65. As here shown, the photoelectric element 61 is a photoresistor which is connected in series with a battery 66 so that a signal $V_1$ (FIG. 5) which has a voltage that is at any given time substantially proportional to the intensity of the modulated or reflected light beam is developed across a load resistor 67. It will, however, be understood that other types of photosensitive elements, such as photovoltaic cells and photosensitive amplifying devices, could be used. Also, it is assumed that the elements 15a–15d are substantially opaque and have a low degree of reflectance, but have a width or diameter somewhat less than the width of the light beam as measured in the plane of the elements 15a–15d. In other words, it is assumed that when the light beam is centered on any one of the elements 15a–15d, the aligned one of the surfaces 63a–63d is only partially masked. Consequently, to set the attenuation levels for the successive transmission paths such that the beam attenuation is at an intermediate level as the beam traverses one of the elements 15a–15d, the surfaces 63a–63d preferably have a retro-reflective or mirror-like finish to exhibit a relatively high degree of reflectance, whereas the surfaces 64a–64e preferably have a dull or light dispersive finish to exhibit a relatively low degree of reflectance.

Figure 5:
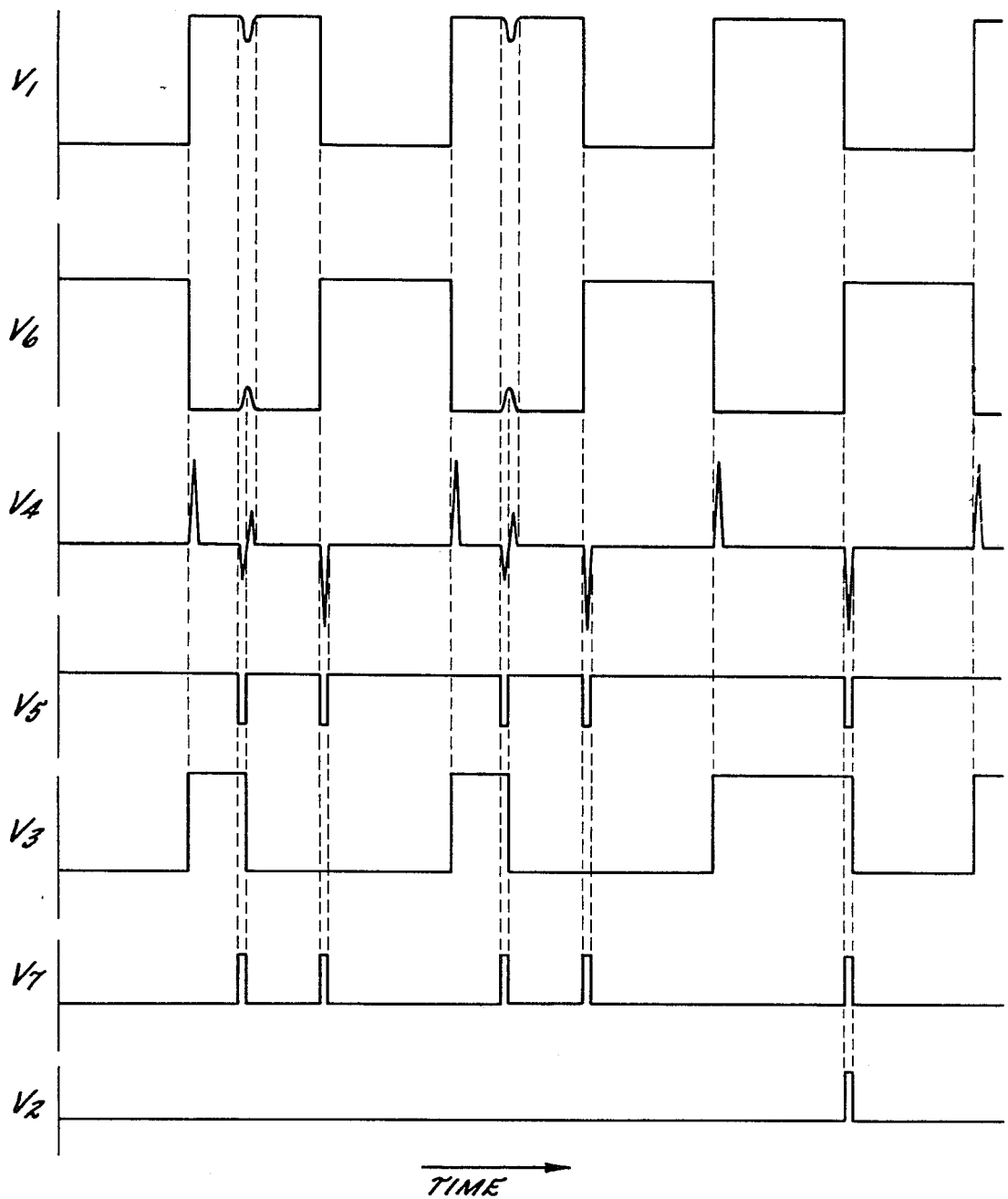
FIG. 5 is a timing chart which illustrates the relationship with respect to time of the voltages appearing at various points in the circuit of FIG. 4.

Referring further to FIGS. 4 and 5, in carrying out the present invention, a logic circuit is included for monitoring the signal $V_1$ to determine whether or not any of the elements 15a–15d is absent. As will be appreciated, in the illustrated embodiment, there are three relative levels or values which the signal $V_1$ may have as the beam is swept across the array; specifically, a first relatively high level corresponding to the characteristic attenuation of the beam as it is reflected by one of the surfaces 63a–63d without the masking or attenuation modifying effect of one of the elements 15a–15d, a second relatively low level corresponding to the characteristic attenuation of the beam as it is reflected by one of the surfaces 64a–64e, and a third or intermediate level corresponding to the characteristic attenuation of the beam as it traverses one of the elements 15a–15d to be reflected by the associated one of the surfaces 63a–63d with the masking or attenuation modifying effect of the element. To simplify and clarify the description of the logic circuitry, the signal $V_1$ has been shown in FIG. 5 as changing levels in relatively sharp steps. Of course, in practice there are more gradual transitions due to the finite time required for the beam to traverse the boundary regions between areas with different attenuating characteristics, such as when a part of the beam is reflected from one of the surfaces 63a–63d and another part is reflected from an adjacent one of the surfaces 64a–64e. Also, a constant sweep or scan speed has been assumed in FIG. 5, although a varying or non-uniform sweep speed could be used.

More particularly, the logic circuit examines the sequence of changes in the level or value of the signal $V_1$ changes to detect a missing element condition. In the exemplary embodiment, the logic circuit provides an output signal $V_2$ for energizing an appropriate utilization device 71, such as a process controller, whenever the signal $V_1$ changes in immediately successive steps from its second or low level, to its first or high level, and back to its second or low level, without the intervention of a momentary change to its third or intermediate level.

To that end, the logic circuit includes a bistable device, specifically a flip-flop circuit 72, which switches operating states, i.e., sets and rests, in response to positive going transitions of the input signals applied thereto, provided that the magnitudes of the transitions satisfy predetermined triggering or switching thresholds of the flip-flop circuit. The photosensitive element 61 is coupled to the set input of the flip-flop circuit 72 through an amplifier 73 which has a gain selected to ensure that the threshold level for triggering the flip-flop circuit 72 is satisfied by the positive going transitions of the signal $V_1$ as it changes from its second or low level to its first or high level, but not by the positive going transitions of the signal $V_1$ as it changes from its third or intermediate level to its first or high level. The set output of the flip-flop circuit 72 is coupled to a first input of a coincidence gate, specifically an AND gate 74. Thus, as indicated in FIG. 5 by the wave form $V_3$, the first input of the AND gate 74 is energized as the beam initiates its sweep across each of the inspection areas 24a–24d and remains energized until the flip-flop circuit 72 is reset.

The reset timing for the flip-flop circuit 72 depends on whether or not the beam traverses an element 15a–15d during the course of its sweep across an inspection area 24a–24d. More particularly, provision is made for resetting the flip-flop circuit 72 in response to, but with a slight delay following, the first drop that occurs in the level of the signal $V_1$, regardless of whether the first drop of the signal $V_1$ is to its second or low level or to its third or intermediate level. For that purpose, there is a high gain differentiating amplifier 76 which is coupled to the photosensitive element 61 for providing a signal $V_4$ comprising a train of positive and negative going pulses which respectively correspond to the positive and negative going transitions of the signal $V_1$. The signal $V_4$ is, in turn, applied to a half wave rectifying and clipping circuit 77 which blocks or rejects the positive going pulses and shapes the negative going pulses of the signal $V_4$ to provide a train of negative-going pulses $V_5$ which are applied to the reset input of the flip-flop circuit 72. By virtue of the gain selected for the high gain differentiating amplifier 76, each of the pulses $V_5$ is of ample amplitude to satisfy the triggering or switching threshold of the flip-flop circuit 72, even though some of the pulses $V_5$ correspond to changes in the signals $V_1$ from its first or high level to its third low level, while the others correspond to lesser changes in the signals $V_1$ from its first or high level to its third or intermediate level. Indeed, as here shown, the pulses $V_5$ all have the same amplitude due to the clipping action of the rectifying and clipping circuit 77. Also, because of the inherent differentiating time constant of the high gain differentiating amplifier 76 and the shaping action of the rectifying and clipping circuit 77, the negative going leading edges of the pulses $V_5$ substantially coincide in time with the corresponding negative going transitions of the signal $V_1$, but the positive going trailing edges $V_5$ are slightly delayed with respect thereto. Accordingly, if an element 15a–15d is traversed as the beam sweeps across one of the inspection areas 24a–24d, the flip-flop circuit 72 is rest before the beam sweeps into the next adjacent space. However, when the element is missing, the flip-flop circuit 72 is reset only after the beam leaves the inspection area and sweeps into the next adjacent space.

Accordingly, for indicating the beam position with sufficient particularity to discriminate situations in which the reset of the flip-flop circuit 72 occurs in response to the presence of an element 15a–15d from those in which it occurs in response to the sweep of the beam out of an inspection area 24a–24d, there is an inverter 78 for applying the signal compliment $V_6$ of the amplified signal $V_1$ to a second input of the AND gate 74. The signal $V_6$ is below the threshold level for the AND gate 74 whenever the beam is within an inspection area 24a–24d, including those points at which a slight rise in its level occurs as the beam sweeps across one of the elements 15a–15d. In other words, the signal $V_6$ is interpreted by the AND gate 74 as having a low or "0" inhibiting level while each inspection area 24a–24d is swept by the beam. Consequently, the signals $V_3$ and $V_6$ are concurrently at high or "1" enabling levels only when an element 15a–15d is missing from an inspection area 24a–24d to thereby cause the flip-flop circuit 72 to be set as the beam sweeps out of the inspection area. Thus, the signals $V_3$ and $V_6$ are alone sufficient to provide a timely indication of a missing element condition.

However, in many instances substantial simplification and economy can be realized by ensuring that the duration of the output indication $V_2$ of a missing element condition is substantially constant and independent of the duration of the beam sweep speed, since the utilization device 71 then requires only a narrow band input response characteristic. This is especially important when a varying beam sweep speed is employed, since otherwise the duration of the signal $V_2$ might vary over such a wide range that substantial difficulties would be encountered in attempting to provide the utilization device 71 with a sufficient input band width to reliably respond to the signal $V_2$. Accordingly, in the illustrated embodiment, an inverter 79 is employed to provide the compliment $V_7$ of the signal $V_5$ to a third input of the AND gate 74. As will be appreciated, the signal $V_7$ is normally at a low or "0" level. However, following each negative going transition of the signal $V_1$, the signal $V_7$ is at a high or "1" level for a brief period which depends primarily on the differentiating time constant of the high gain differentiating amplifier 76 which, in turn, is independent of the beam sweep speed. Thus, with the addition of the signal $V_7$ the AND gate 74 is enabled to provide a missing element indicating pulse $V_2$ only after the beam has swept across a complete inspection area 24a–24d without traversing an element 15a–15d, and the duration of any pulse $V_2$ that is produced is substantially constant and independent of the beam sweep speed.

CONCLUSION

In view of the foregoing, it will be appreciated that the present invention provides relatively simple, but highly reliable, inspection apparatus for detecting missing or broken element conditions in multielement arrays. Since the modulation of a radiant energy beam is relied on to determine whether or not any of the elements is missing, the inspection apparatus requires no physical contact with the elements of the array and can, therefore, be used without any danger of increasing the risk of any of the elements breaking and without imposing any operating limitations on the process or equipment with which the elements under inspection may be involved. Consequently, it will be understood that the present invention may be readily adapted to use with a wide variety of different processes and equipments.

What is claimed is:

1. A missing element condition detector for multielement arrays, said detector comprising the combination of source means for providing a beam of radiant energy, receiver means for providing a first signal having a value which is a function of the intensity of the radiant energy incident thereon, means for defining a plurality of radiant energy transmission paths for carrying said beam from said source means to said receiver means, each of said transmission paths having a portion aligned with a respective one of said elements and being wide relative to said one element so as to extend in opposite directions from said portion into the spaces adjacent said one element, each of said transmission paths also having a characteristic attenuation level which is modified over said portion of said path when an element is present, means for sweeping said beam across said elements and the spaces between them so that said beam has a first value as it encounters the characteristic attenuation level of said paths and a second value as it traverses said elements to encounter the modified attenuation level of the aligned portions of said paths, means for signaling the sweep of said beam from one of said transmission paths to the next, means responsive to said first signal and said signaling means for providing an output signal indicative of the absence of one of said elements when said first signal remains at said first value from the point at which said beam enters to the point at which said beam exits from one of said transmission paths.

2. A detector for indicating the absence of any one of a plurality of spaced apart elements, said detector comprising the combination of:

source means for producing a beam of radiant energy, receiver means for providing a first signal having a value which is a function of the intensity of the radiant energy incident thereon, means defining a plurality of adjacent transmission paths for carrying said beams from said source means to said receiver means, a first set of alternate ones of said paths having a first attenuation level, and a second set of alternate ones of said paths having a second attenuation level, each of said first set of paths having a portion positioned to align with a respective one of said elements and being of sufficient width to extend into the spaces adjacent said one element, whereby the attenuation level of said portion is modified when an element is present to a level intermediate said first and second attenuation levels, scanning means for sweeping said beam across said elements and the spaces between them, whereby said beam is sequentially transmitted from said source means to said receiver means through successive ones of said paths to cause said first signal to have first and second values as paths of said first and second sets respectively carry said beam and a third value intermediate said first and second values as said beam traverses an element, and circuit means coupled to said receiving means to supply an output signal indicative of the absence of an element in response to said first signal changing in immediate succession from said second value to said first value and back to said second value.

3. The detector of claim 2 wherein said scanning means comprises a head containing said source, and a guide means mounting said head for movement along a predetermined path selected so that said beam is swept across said elements and the spaces between them as said head is moved along said path.

4. The detector of claim 2 wherein said elements are spaced apart along a line, and said scanning means includes a head containing said source, and a drive means coupled to said head for reciprocating it along a predetermined path spaced from but substantially parallel to said line, whereby said beam is repeatedly swept across said elements and the spaces between them.

5. The detector of claim 2 wherein said circuit means includes a bistable device having first and second operating states, means coupled between said receiver means and said bistable device for switching said device to operation in said first state in response to said first signal changing from said first value to said second value and also in response to said first signal changing from said first value to said intermediate value, means coupled between said receiver means and said bistable device for switching said device to operation in said second state in response to said first signal changing from said second value to said first value, and means coupled to said receiver means and to said bistable device for providing said output signal in response to said first signal changing from said first value to said second value while said bistable device is operating in said second state.

6. The detector of claim 5 wherein said source means comprises a light source, said beam is a light beam, and said receiver means includes photosensitive means positioned to intercept the light incident on said receiver means, whereby the value of said first signal is a function of the intensity of said incident light.

7. The detector of claim 6 wherein said elements are spaced apart along a line, and said scanning means comprises a head containing said light source, and a drive means coupled to said head for reciprocating it along a predetermined path spaced from but substantially parallel to said line, whereby said light beam is repeatedly swept across said elements and the spaces between them.

8. The detector of claim 2 wherein said elements are spaced along a line, said source means comprises a light source for providing said beam as a light beam, said scanning means includes a head having said light source positioned therein to transmit said beam in a direction substantially normal to said elements, and a drive means coupled to said head for reciprocating it along a predetermined path spaced from said elements but substantially parallel to said line, said receiver means includes a photosensitive device positioned to intercept the light incident on said receiver means, whereby the value of said first signal is a function of the intensity of said incident light, and said circuit means includes coincidence gate means having first and second inputs, bistable means having an output coupled to the first input of said gate, means coupled between said photosensitive device and said bistable means for switching said bistable means to operation in a first state to thereby energize the first input of said gate means in response to said first signal changing from said second value to said first value, means coupled between said photosensitive means and said bistable means for switching said bistable means from said first state to said second state in response to but with a slight delay following changes of said first signal from said first level to said second level and also from said first level to said intermediate level, and means coupled between said photosensitive means and said second input of said gate means for energizing said second input whenever said first signal is at said second level whereby the first and second inputs of said gate means are concurrently energized only when said beam sweeps completely across one of the paths of said first set without traversing an element.

9. The detector of claim 8 wherein
said gate means has a third input, and
said means for switching said bistable means from said first state to said second state includes
differentiating means coupled to said photosensitive means for supplying a pulse having a substantially constant duration defined by leading and trailing edges in response to any change of said first signal from said first level to either said second or said intermediate level.
means coupled between said differentiating means and said bistable means for switching said bistable means to said second state in response to the trailing edge of any such pulse, and
means coupled between said differentiating means and said third input of said gate means for energizing said third input for the duration of any such pulse
whereby said gate means is enabled for the duration of said pulse to supply said output signal whenever said beam sweeps completely across one of the paths of said first set without traversing an element.

10. Inspection apparatus for detecting discontinuities in any one of a plurality of elongated elements as said elements are moved lengthwise relative to said apparatus through respective spaced apart inspection areas which are wide relative to said elements, said apparatus comprising the combination of
source means for producing a beam of light,
scanning means coupled to said source means for sweeping said beam across said inspection areas and the spaces between them,
photosensitive receiver means for providing a first signal having a value which is a function of the intensity of the light incident thereon,
light attenuating means positioned to transmit said beam from said source means to said receiver means as said beam is swept,
said attenuating means defining a first set of paths having a first attenuating level for carrying said beam as said inspection areas are swept, and a second set of paths having a second attenuating level for carrying said beam as the spaces between said inspection areas are swept, each of said first set of paths having a segment which is positioned to align with a respective one of said elements and which has an attenuating level intermediate said first and second levels when said element is present, whereby the intensity of the light incident on said receiver means is modulated such that said first signal has first and second values as said beam respectively sweeps across said inspection areas and the spaces between them and a third value intermediate said first and second values as said beam traverses any element present in an inspection area, and
circuit means coupled to said receiver means for providing an output signal indicative of the absence of an element in response to said first signal changing in immediately successive steps from said second value to said first value and back to said second value.

11. Inspection apparatus according to claim 10 wherein said circuit means includes a bistable device having first and second stable operating states, means coupled between said receiver means and said bistable device for switching said device to operation in said first state in response to said first signal changing from said first value to said second value and also in response to said first signal changing from said first value to said intermediate value, means coupled between said receiver means and said bistable device for switching said device to operation in said second state in response to said first signal changing from said second value to said first value, and means coupled to said receiver means and said bistable device for providing said output signal in response to said first signal changing from said first value to said second value while said bistable device is operating in said second state.

12. Inspection apparatus according to claim 10 wherein said circuit means includes coincidence gate means having first and second inputs, bistable means having an output coupled to the first input of said gate, means coupled between said photosensitive device and said bistable means for switching said bistable means to operation in a first state to thereby energize the first input of said gate means in response to said first signal changing from said second value to said first value, means coupled between said photosensitive means and said bistable means for switching said bistable means from said first state to said second state in response to but with a slight delay following changes of said first signal from said first value to said second value and also from said first value to said intermediate value, and means coupled between said photosensitive means and said second input of said gate means for energizing said second input whenever said first signal is at said second value whereby the first and second inputs of said gate means are concurrently energized only when said beam sweeps completely across one of said inspection areas without traversing an element.

13. Inspection apparatus according to claim 12 wherein said gate means has a third input, and said means for switching said bistable means from said first state to said second state includes differentiating means coupled to said photosensitive means for supplying a pulse having a substantially constant duration defined by leading and trailing edges in response to any change of said first signal from said first level to either said second or said intermediate level, means coupled between said differentiating means and said bistable means for switching said bistable means to said second state in response to the trailing edge of any such pulse, and means coupled between said differentiating means and said third input of said gate means for energizing said third input for the duration of any such pulse whereby said gate means is enabled for the duration of said pulse to supply said output signal whenever said beam sweeps completely across one of said inspection areas without traversing an element.

14. The inspection apparatus of claim 10 wherein said elements are disposed in a planar array as they are moved through said inspection areas, and said scanning means includes a head having said source positioned therein for transmitting said beam in a direction substantially normal to said planar array, and a drive means for reciprocating said head along a line spaced from but substantially parallel to said planar array.

15. The inspection apparatus of claim 10 wherein
said source means and said receiver means are disposed at one side of said inspection areas, and
said attenuating means includes, at the opposite side of said inspection areas,
a first plurality of surfaces having a relatively high reflectance to complete one of said sets of paths, and
a second plurality of surfaces having a relatively low reflectance to complete the other of said sets of paths.

16. Inspection apparatus according to claim 10 wherein
said elements are disposed in a planar array as they are moved through said inspection areas,
said scanning means is spaced from one side of said array and includes a head with said source means and receiver means positioned therein to respectively transmit and receive light along a line substantially normal to the plane of said array, and drive means coupled to said head for reciprocating it along a predetermined path substantially parallel to the plane of said array, and said attenuating means includes, in a plane spaced from the opposite side of said array but substantially parallel to the plane of said array, a first plurality of surfaces having a relatively high reflectance to complete one of said sets of paths, and a second plurality of surfaces having a relatively low reflectance to complete the other sets of paths.

17. Inspection apparatus according to claim 16 wherein said circuit means includes a bistable device having first and second operating states, means coupled between said receiver means and said bistable device for switching said device to operation in said first state in response to said first signal changing from said first value to said second value and also in response to said first signal changing from said first value to said intermediate value, means coupled between said receiver means and said bistable device for switching said device to operation in said second state in response to said first signal changing from said second value to said first value, and means coupled to said receiver means and said bistable device for providing said output signal in response to said first signal changing from said first value to said second value while said bistable device is operating in said second state.

18. Inspection apparatus according to claim 16 wherein said circuit means includes coincidence gate means having first and second inputs, bistable means having an output coupled to the first input of said gate, means coupled between said photosensitive device and said bistable means for switching said bistable means to operation in a first state to thereby energize the first input of said gate means in response to said first signal changing from said second value to said first value, means coupled between said photosensitive means and said bistable means for switching said bistable means from said first state to said second state in response to but with a slight delay following changes of said first signal from said first level to said second level and also from said first level to said intermediate level, and means coupled between said photosensitive means and said second input of said gate means for energizing said second input whenever said first signal is at said second level whereby the first and second inputs of said gate means are concurrently energized only when said beam sweeps completely across one of said inspection areas without traversing an element.

19. Inspection apparatus according to claim 18 wherein said gate means has a third input, and said means for switching said bistable means from said first state to said second state includes differentiating means coupled to said photosensitive means for supplying a pulse having a substantially constant duration defined by leading and trailing edges in response to any change of said first signal from said first level to either said second or said intermediate level, means coupled between said differentiating means and said bistable means for switching said bistable means to said second state in response to the trailing edge of any such pulse, and means coupled between said differentiating means and said third input of said gate means for energizing said third input for the duration of any such pulse whereby said gate means is enabled for the duration of said pulse to supply said output signal whenever said beam sweeps completely across one of said inspection areas without traversing an element.

20. Inspection apparatus according to claim 16 wherein each of said first plurality of surfaces is positioned in a respective one of said first sets of paths such that said first attenuation level is relatively low, each of said second plurality of surfaces is positioned in a respective one of said second sets of paths such that said second attenuation level is relatively high, and said elements are substantially opaque to light whereby the presence of said element in alignment with a segment of any one of said first sets of paths increases the attenuation level thereof to said intermediate level.

21. Inspection apparatus according to claim 20 wherein said first signal has relatively high and low values as said inspection areas and the spaces between them are respectively traversed by said beam and an intermediate value as any of said elements are traversed by said beams, said said circuit means includes a bistable means having first and second operating states, high gain differentiating means coupled between said receiver means and said differentiating means for switching said bistable means to said first stable state in response to but with a slight delay following any drop of said first signal from said high value, means coupled between said receiver means and said bistable means for switching said bistable means to said second stable state in response to any change of said first signal from said second value to said first value, and means coupled to said receiver means and said bistable means for providing said output signal in response to any change of said first signal from said first value to said second value at a time said bistable means is operating in said first state.

22. Inspection apparatus for detecting discontinuities in any of a plurality of spaced apart elements, said apparatus comprising the combination of source means for sweeping a beam of light across said elements and the spaces between them, means aligned with said source means and said elements for modulating the intensity of said beam so that it is at a first level as said beam traverses a first segment of any one of said spaces a second level as said beam traverses a second segment of any one of said spaces, said second segment being defined as an area between the first segment of said one space and an element adjacent to said one space, and a third level as said beam traverses any one of said elements, means positioned to receive the light beam and being responsive to the modulated intensity thereof to provide an output signal indicative of a discontinuity in one of said elements in response to said intensity changing in immediately successive steps from said first level to said second level and back to said first level.

23. Inspection apparatus for sensing the absence of an element within an array of spaced apart elements, said apparatus comprising the combination of a photoelectric source for transmitting a light beam, a receiver including a photosensitive means responsive to the intensity of incident light, means housing said source and said photosensitive means at one side of said array for movement transversely of said elements and the spaces between them along a path substantially parallel to the array, first and second sets of reflective surfaces having respective and different degrees of reflectivity, said reflective surfaces being mounted at the opposite side of the array with the surfaces of the first set alternating with the surfaces of the second set along a line substantially parallel with said path and said array whereby transmission and reflection of said light beam away from said source and back toward said photosensitive means at all times occurs along substantially identical optical axes, each of said first set of reflective surfaces having an intermediate portion normally aligned with and partially masked by a respective one of said elements whereby the intensity of the light incident on said photosensitive means is modulated as said source is moved along said path to have a first level as the beam traverses any of the reflective surfaces of the second set, a second level as the beam traverses any of the reflective surfaces of the first set without impinging on any of said elements, and a third level as the beam traverses any of said elements; and means coupled to said receiver for providing an output signal indicating the absence of an element when the intensity of the light incident on said photosensitive means changes in immediately successive steps from said first level to said second level and back to said first level.

References Cited
UNITED STATES PATENTS

| | | | |
|---|---|---|---|
| 3,452,209 | 6/1969 | Melkonjan et al. | 250—219 S |
| 3,575,515 | 4/1971 | Fertig | 356—199 |
| 3,589,816 | 6/1971 | Sugaya | 356—199 |

WILLIAM L. SIKES, Primary Examiner

U.S. Cl. X.R.

250—219; 350—238